United States Patent
Nakanishi et al.

(10) Patent No.: US 9,604,868 B2
(45) Date of Patent: Mar. 28, 2017

(54) PREFORM MANUFACTURING METHOD

(71) Applicant: SUMITOMO ELECTRIC INDUSTRIES, LTD., Osaka-shi, Osaka (JP)

(72) Inventors: Tetsuya Nakanishi, Yokohama (JP); Toshiki Taru, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 250 days.

(21) Appl. No.: 14/378,738

(22) PCT Filed: Feb. 20, 2014

(86) PCT No.: PCT/JP2014/054060
§ 371 (c)(1),
(2) Date: Aug. 14, 2014

(87) PCT Pub. No.: WO2014/129553
PCT Pub. Date: Aug. 28, 2014

(65) Prior Publication Data
US 2016/0229733 A1    Aug. 11, 2016

(30) Foreign Application Priority Data

Feb. 20, 2013   (JP) ................................ 2013-030890

(51) Int. Cl.
*C03B 37/012*   (2006.01)
*G02B 6/02*   (2006.01)

(52) U.S. Cl.
CPC .. *C03B 37/01222* (2013.01); *C03B 37/01231* (2013.01); *C03B 37/01245* (2013.01);
(Continued)

(58) Field of Classification Search
CPC ................................................ C03B 37/01222
See application file for complete search history.

(56) References Cited

U.S. PATENT DOCUMENTS

| 4,832,720 A * | 5/1989 | Watanabe ......... C03B 37/01222 65/409 |
| 2010/0008634 A1* | 1/2010 | Guertin ............. C03B 37/01222 385/126 |
| 2013/0183016 A1* | 7/2013 | Imamura ............ G02B 6/02042 385/127 |

FOREIGN PATENT DOCUMENTS

| CN | 101373239 | 2/2009 |
| JP | S61-201633 A | 9/1986 |

(Continued)

OTHER PUBLICATIONS

English-language translation of International Preliminary Report on Patentability (IPRP) dated Sep. 3, 2015 that issued in WO Patent Application No. PCT/JP2014/054060.

*Primary Examiner* — Erin Snelting
(74) *Attorney, Agent, or Firm* — Drinker Biddle & Reath LLP

(57) ABSTRACT

A preform manufacturing method of the present invention has a hole forming step of forming a plurality of holes in a glass body to produce a glass pipe, and a heating integration step of heating the glass pipe with core rods including core portions being inserted in the respective holes, thereby to implement integration of the core rods and the glass pipe. In the hole forming step, a peripheral hole out of the holes to be formed in the glass body is formed at a position determined in consideration of positional variation of the core portion before and after the integration.

6 Claims, 10 Drawing Sheets

(52) U.S. Cl.
CPC .... *C03B 37/01248* (2013.01); *C03B 2203/34* (2013.01); *G02B 6/02333* (2013.01)

(56) References Cited

FOREIGN PATENT DOCUMENTS

| | | |
|---|---|---|
| JP | S61-251534 A | 11/1986 |
| JP | H09-90143 A | 4/1997 |
| JP | 2005-084201 | 3/2005 |
| JP | 2011-168464 A | 9/2011 |
| JP | 2013-063890 | 4/2013 |

\* cited by examiner

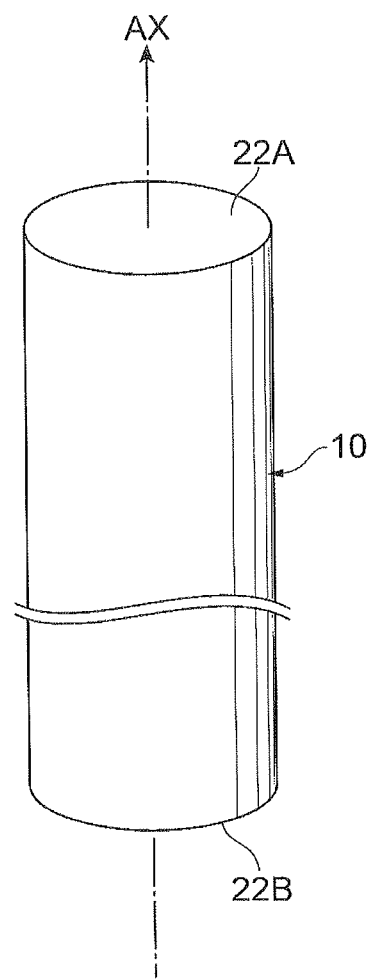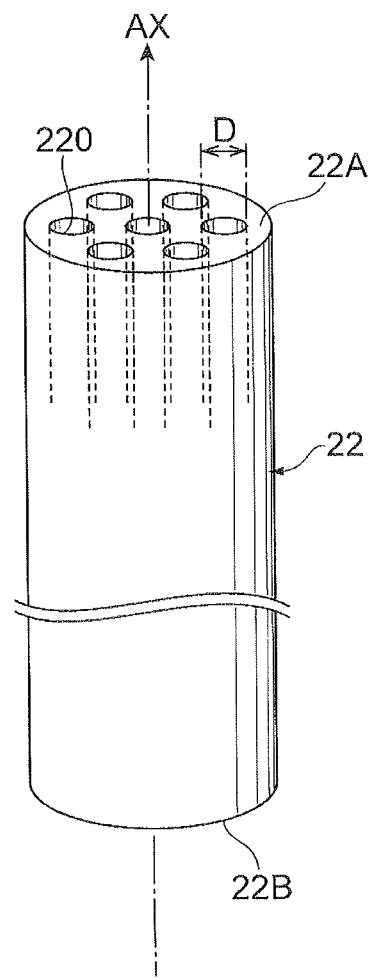

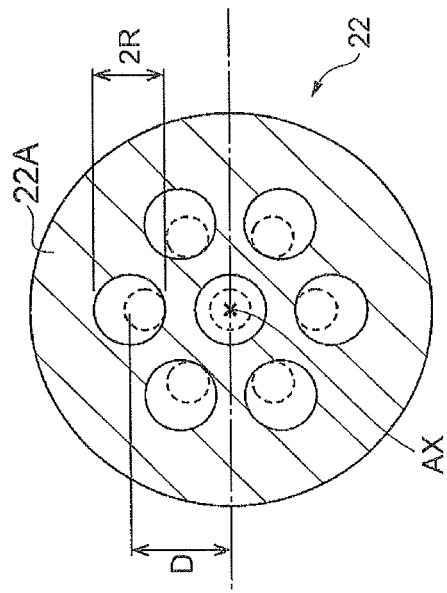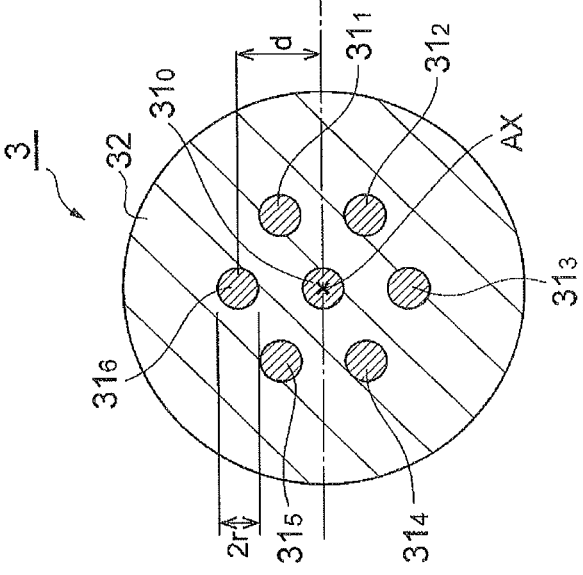

PREFORM MANUFACTURING METHOD

TECHNICAL FIELD

The present invention relates to a preform manufacturing method for manufacturing a multicore optical fiber preform having a plurality of core portions each extending in a predetermined axial direction.

BACKGROUND ART

A multicore optical fiber preform having a plurality of core portions each extending in a predetermined axial direction can be manufactured by the rod-in-collapse method (cf. Patent Literatures 1 and 2). In the rod-in-collapse method, first, a glass body of a nearly circular cylinder shape is perforated to form a plurality of holes extending along a central axis of the glass body, thereby producing a glass pipe. Subsequently, a plurality of core rods each including a core portion are inserted into the respective holes of the glass pipe and the glass pipe is heated with the plurality of core rods being inserted in the respective holes, thereby to implement integration of the plurality of core rods and the glass pipe. The multicore optical fiber preform is manufactured through the above rod-in-collapse method.

A multicore optical fiber can be manufactured by drawing the multicore optical fiber preform manufactured as described above.

CITATION LIST

Patent Literatures

Patent Literature 1: Japanese Patent Application Laid-Open Publication No. S61-201633
Patent Literature 2: Japanese Patent Application Laid-Open Publication No. 2011-168464

SUMMARY OF INVENTION

Technical Problem

The Inventors conducted research on the conventional preform manufacturing method and found the problem as described below. Namely, for manufacturing an optical fiber preform having one core portion, a core rod is inserted into a hole located at the central axis of the glass pipe (which will be referred to hereinafter as pipe central axis) and, heating in axial symmetry is carried out while rotating the glass pipe around the pipe central axis. This process results in implementing integration of the glass pipe and the core rod. Deformation of the glass pipe during this heating integration step occurs in symmetry about the pipe central axis. As a result, glass in the vicinity of the core rod deforms toward the pipe central axis, thereby to implement the integration of the core rod and the glass pipe. Therefore, in the case of the optical fiber preform having one core portion, the core portion can be accurately arranged at the position of the central axis of the optical fiber preform.

In contrast to it, for making optical connection of cores in a multicore optical fiber with a light emitting device or with a light receiving device or optical connection of cores in a certain multicore optical fiber with cores in another multicore optical fiber, it is important to make a connection loss as small as possible. For realizing it, the positions of the respective core portions in a cross section of the multicore optical fiber preform need to be precisely controlled. In the multicore optical fiber preform, however, the deformation of glass in the vicinity of the core rods during the heating integration step is not symmetrical as to the core portions located off the central axis of the multicore optical fiber preform (which will be referred to hereinafter as preform central axis) out of the plurality of core portions. As a result, the centers of the holes do not coincide with the centers of the core portions after the integration. For this reason, it is difficult to arrange the core portions located off the preform central axis, accurately at as-designed positions.

When a clearance is too large between an inner wall surface of each hole of the glass pipe and an outer peripheral surface of the core rod, it will tend to increase a positional deviation of the core portion in the multicore optical fiber preform. As long as the clearance is small, the positional deviation of the core portion after the integration can be kept small. However, when the clearance is too small, it becomes difficult to insert the core rod into the hole of the glass pipe. In addition, the inner wall surface of the hole of the glass pipe or the outer peripheral surface of the core rod is likely to be scratched during insertion of the core rod, and this scratch will be a cause to generate bubbles or the like at an interface.

Furthermore, relationship between core diameter and inter-core pitch in the multicore optical fiber is determined in a single rod-in-collapse step and cannot be corrected in a subsequent step. In addition, it is difficult to acquire information of the positions of the core portions in a cross section from the multicore optical fiber preform by nondestructive means such as a preform analyzer and also difficult to finely adjust them. Therefore, it is desirable to highly accurately achieve the desired core pitch or the like in the rod-in-collapse step.

The present invention has been accomplished in order to solve the problem as described above, and it is an object of the present invention to provide a preform manufacturing method allowing easy manufacture of a multicore optical fiber preform in which a plurality of core portions are accurately arranged at as-designed positions.

Solution to Problem

A preform manufacturing method according to the present invention is a method for manufacturing a multicore optical fiber preform comprising a plurality of core portions each extending in a predetermined axial direction, and a common cladding portion covering each of the plurality of core portions.

As a first aspect of the present invention, the preform manufacturing method comprises a hole forming step and a heating integration step. The hole forming step is to prepare a glass body to constitute a part of the common cladding portion, and to perforate the glass body to form a plurality of holes extending in the axial direction of the glass body, thereby producing a glass pipe. The heating integration step is to prepare a plurality of core rods including the respective core portions, to insert the plurality of core rods into the respective holes of the glass pipe, and to heat the glass pipe with the core rods being inserted in the respective holes, thereby to implement integration of the plurality of core rods and the glass pipe. Finally, the multicore optical fiber preform is manufactured through the hole forming step and the heating integration step.

In this first aspect, as a structure parameter after the integration, d is defined as a distance between a center position of a peripheral core portion located off the preform central axis out of the plurality of core portions in the multicore optical fiber preform to be manufactured, and the preform central axis. Furthermore, as structure parameters before the integration, r is defined as a radius of a peripheral core rod corresponding to the peripheral core portion, R as a radius of a peripheral hole into which the peripheral core rod is to be inserted, out of the plurality of holes to be formed in the glass body, and D as a distance between a center position of the peripheral hole and a central axis of the glass body. Under this definition, the foregoing hole forming step is configured to perforate the glass body to form the peripheral hole at a position satisfying the following relation on a straight line connecting the center position of the peripheral core portion and the central axis of the glass body.

$d < D \leq d + R - r$

As a second aspect applicable to the above first aspect, when $\phi$ is defined as a diameter reduction ratio of an outer diameter of a multicore optical fiber to be manufactured by drawing the multicore optical fiber preform, with respect to an outer diameter of the multicore optical fiber preform, the hole forming step is preferably configured to set the radius R of the peripheral hole so as to satisfy the following condition.

$R - r \leq 0.5 \ \mu m / \phi$

A preform manufacturing method according to a third aspect also comprises the hole forming step and the heating integration step. In this third aspect, as a structure parameter after the integration, d is defined as a distance between a center position of a peripheral core portion located off the preform central axis out of the plurality of core portions in the multicore optical fiber preform to be manufactured, and the preform central axis. Furthermore, as structure parameters before the integration, r is defined as a radius of a peripheral core rod corresponding to the peripheral core portion, R as a radius of a peripheral hole into which the peripheral core rod is to be inserted, out of the plurality of holes to be formed in the glass body, D as a distance between a center position of the peripheral hole and a central axis of the glass body, and S a sectional area of a clearance in another hole existing between the peripheral hole and the pipe central axis. Under this definition, the hole forming step is configured to perforate the glass body to form the peripheral hole at a position satisfying the following relation on a straight line connecting the center position of the peripheral core portion and the central axis of the glass body.

$d < D \leq d + 2R - r - \sqrt{R^2 - S/\pi}$

As a fourth aspect applicable to the third aspect, when is defined as a diameter reduction ratio of an outer diameter of a multicore optical fiber to be manufactured by drawing the multicore optical fiber preform, with respect to an outer diameter of the multicore optical fiber preform, the hole forming step is preferably configured to set the radius R of the peripheral hole and the clearance so as to satisfy the following condition.

$R - r \leq 0.5 \ \mu m / \phi$

As a fifth aspect applicable to at least any one of the first to fourth aspects, the hole forming step is preferably configured to make a difference between the radius R of the peripheral hole and the radius r of the peripheral core rod not less than 0.15 mm.

Advantageous Effect of Invention

According to the present invention, the hole forming step is configured to form the peripheral hole out of the holes to be formed in the glass body, at the position determined in consideration of positional variation of the core portion before and after the integration of the core rods and the glass pipe. As a result, the method allows easy manufacture of the multicore optical fiber preform in which the plurality of core portions are accurately arranged at as-designed positions.

BRIEF DESCRIPTION OF DRAWINGS

FIGS. 3A and 3B are drawings for explaining the hole forming step in FIG. 2.

FIGS. 10A and 10B are drawings for quantitatively explaining the preform manufacturing method according to the embodiment of the present invention.

DESCRIPTION OF EMBODIMENTS

Embodiments of the present invention will be described below in detail with reference to the accompanying drawings. In the description of the drawings the same elements will be denoted by the same reference signs, without redundant description.

Figure 1:
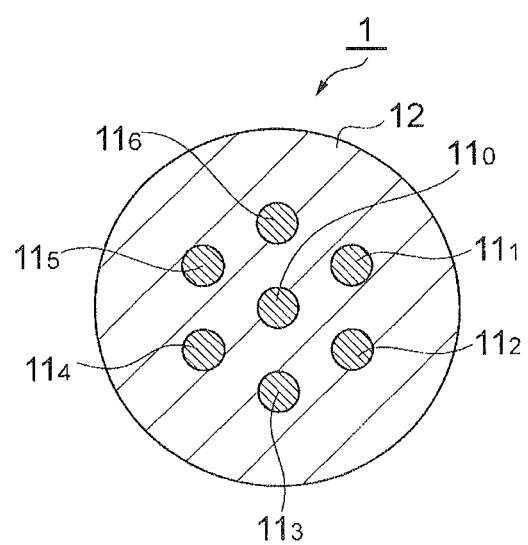
FIG. 1 is a drawing showing a structure in a cross section (note: each cross section perpendicular to a central axis of a multicore optical fiber and a preform thereof will be referred to hereinafter as a transverse section) of an example of multicore optical fiber which can be manufactured by the preform manufacturing method according to the embodiment of the present invention.

FIG. 1 is a drawing showing a structure in a transverse section of an example of multicore optical fiber which can be manufactured by the preform manufacturing method according to the embodiment of the present invention. This multicore optical fiber 1 has seven cores $11_0$ to $11_6$ each extending in a predetermined axial direction, and a common cladding 12 covering each of the cores $11_0$ to $11_6$. The core $11_0$ is arranged on the central axis AX of the multicore optical fiber (which will be referred to hereinafter as fiber central axis). The other cores $11_1$ to $11_6$ are arranged at an equal pitch on the circumference of a circle centered at the fiber central axis AX. Each of the cores $11_0$ to $11_6$ includes a region having the refractive index higher than that of the common cladding 12 and allows light to propagate therein. It is noted in the description hereinafter that the fiber central axis, the central axis of the glass body, the pipe central axis, and the preform central axis will be represented by "AX" as the same central axis.

Figure 2:
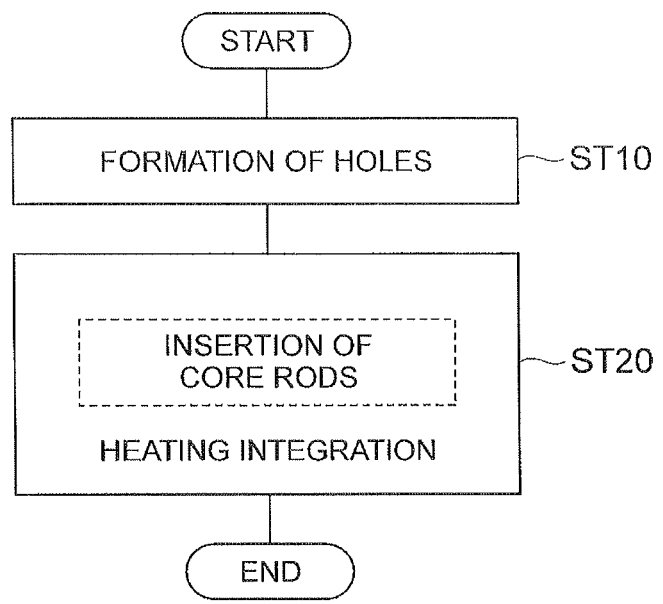
FIG. 2 is a flowchart for explaining the preform manufacturing method according to the embodiment of the present invention.
Figure 4:
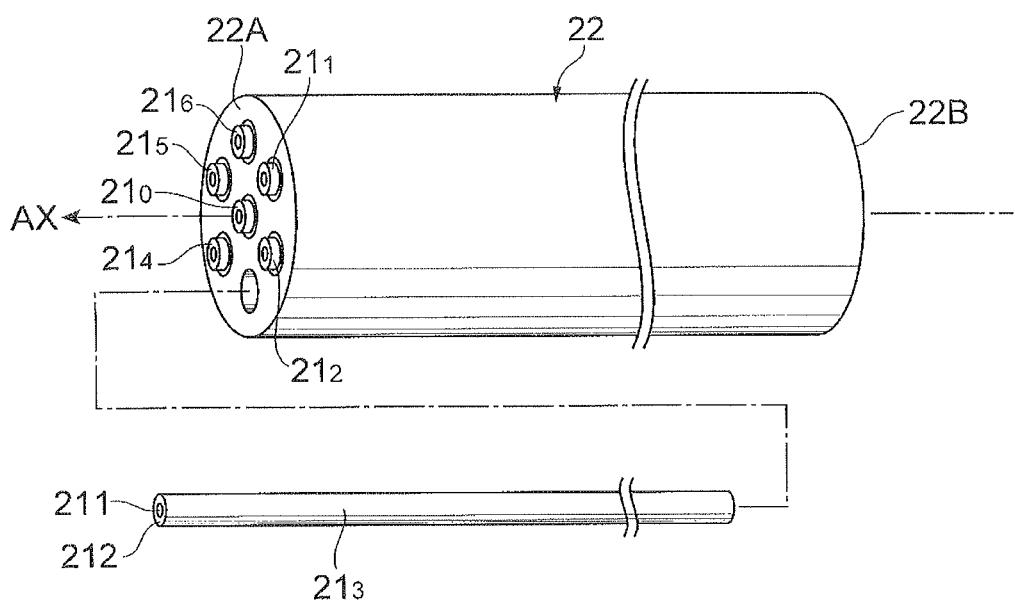
FIG. 4 is a drawing for explaining core rod insertion in the heating integration step in FIG. 2.
Figure 5:
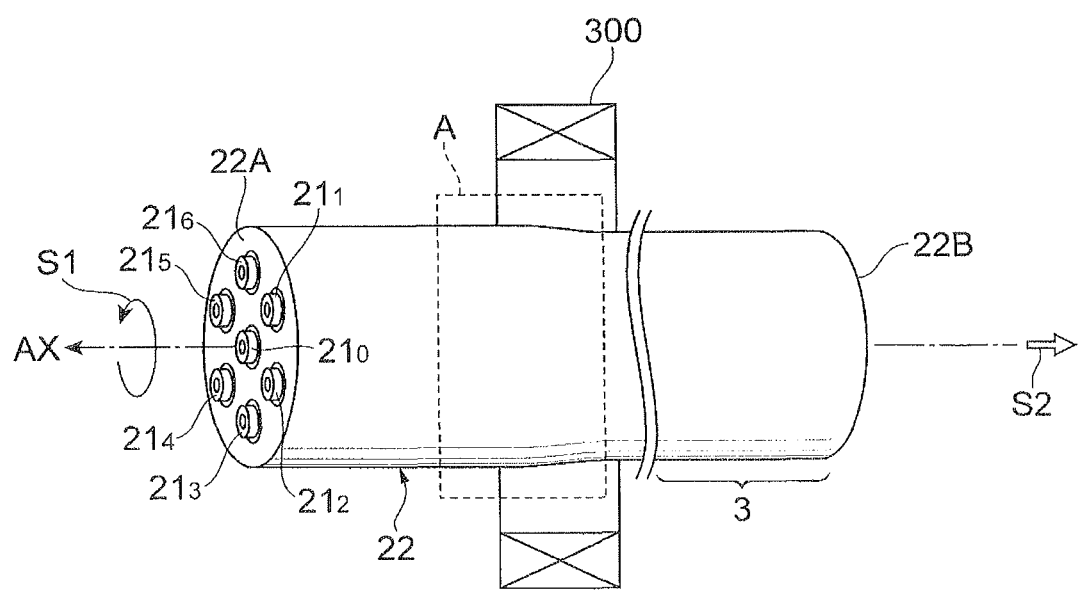
FIG. 5 is a drawing for explaining integration of a glass pipe and core rods in the heating integration step in FIG. 2.
Figure 6:
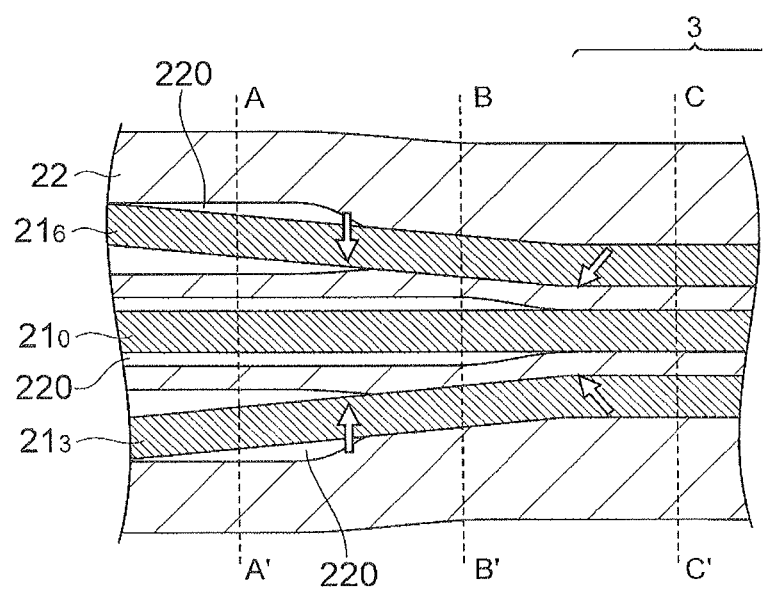
FIG. 6 is a drawing showing a structure in a cross section (note: each cross section including a central axis of a multicore optical fiber preform will be referred to hereinafter as a longitudinal section) of an example of multicore optical fiber preform indicated by a region A in FIG. 5.

The preform manufacturing method according to the embodiment of the present invention has a hole forming step ST10 and a heating integration step ST20, as shown in the flowchart of FIG. 2. FIGS. 3A and 3B are drawings for explaining the hole forming step ST10. FIG. 4 is a drawing for explaining core rod insertion in the heating integration step ST20. FIG. 5 is a drawing for explaining integration of a glass pipe and core rods in the heating integration step ST20. Furthermore, FIG. 6 is a drawing showing a structure in a longitudinal section of a multicore optical fiber preform indicated by region A in FIG. 5, and FIGS. 7A to 7C are drawings showing respective structures in transverse sections of the multicore optical fiber preform, which are taken along the line A-A', the line B-B', and the line C-C', respectively, in FIG. 6. These FIGS. 3A-3B, 4-6, and 7A-7C are for schematically explaining the preform manufacturing method for manufacturing the multicore optical fiber preform 3.

Figure 7A:
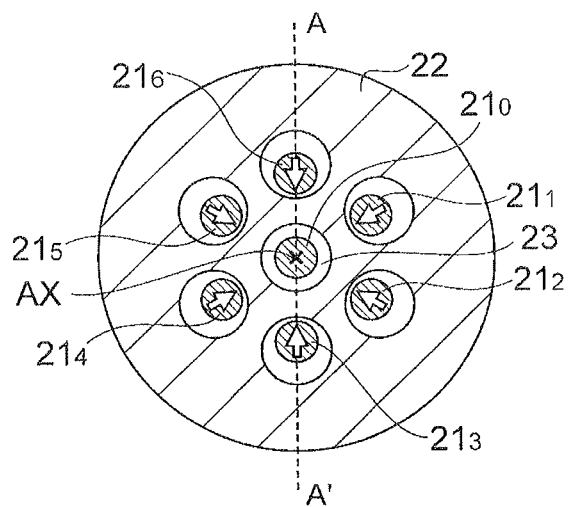
FIGS. 7A to 7C are drawings showing structures in transverse sections of the multicore optical fiber preform along the line A-A', the line B-B', and the line C-C', respectively, in FIG. 6.
Figure 7B:
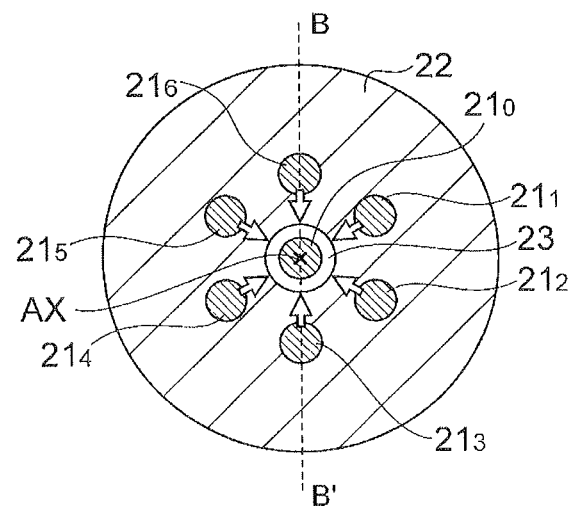
Figure 7C:
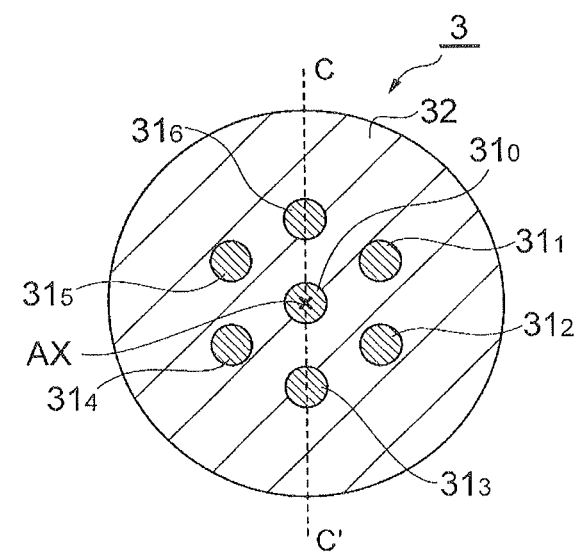

The multicore optical fiber preform 3 manufactured by the preform manufacturing method according to the embodiment of the present invention has, for example as shown in FIG. 7C, seven core portions $31_0$ to $31_6$ each extending in a predetermined axial direction, in a common cladding portion 32. The multicore optical fiber 1 shown in FIG. 1 is manufactured by drawing this multicore optical fiber preform 3 along the preform central axis AX thereof.

First, the hole forming step ST10 is, as shown in FIG. 3A, to prepare a glass body 10 extending along the central axis AX. The glass body 10 constitutes a part of the common cladding portion and has a nearly circular cylinder shape. The glass body 10 is perforated to form seven holes 220 each extending in the axial direction, thereby obtaining a glass pipe 22 as shown in FIG. 3B. Each of the holes 220 has the diameter D and extends from one end face 22A to the other end face 22B of the glass body 10.

In the heating integration step ST20, as shown in FIG. 4, core rods $21_0$ to $21_6$ are inserted into the plurality of holes 220 formed in the glass pipe 22. Each of the core rods $21_0$ to $21_6$ has an inside portion 211 corresponding to a core portion and an outside portion 212 covering it (which constitutes a part of the common cladding portion).

Subsequently, in the heating integration step, as shown in FIG. 5, the glass pipe 22 with the core rods $21_0$-$21_6$ therein is heated by a heat source 300 such as a heater, thereby obtaining the multicore optical fiber preform 3 having the transverse section as shown in FIG. 7C. The glass pipe 22 is heated while changing the relative position thereof to the heat source 300. Namely, the part heated in the glass pipe 22 moves from the other end face 22B to one end face 22A with a lapse of time. During the heating of the glass pipe 22, the glass pipe 22 is rotated in a direction indicated by an arrow S1 about a center at the central axis AX thereof. In the example of FIG. 5, the relative positions of the glass pipe 22 and the heat source 300 are changed by movement of the glass pipe 22 in a direction indicated by an arrow S2, but they may be changed by movement of the heat source 300 or by movement of both of the glass pipe 22 and the heat source 300 in opposite directions.

For example, each of the core rods $21_0$-$21_6$ includes a center core of silica glass doped with chlorine (which corresponds to the inside portion 211 in FIG. 4), and an optical cladding arranged to surround the periphery of this center core and comprised of silica glass doped with fluorine (which corresponds to the outside portion 212 in FIG. 4), and the glass pipe 22 is comprised of silica glass doped with fluorine. As another example, each of the core rods $21_0$-$21_6$ includes a center core (inside portion 211) of silica glass doped with $GeO_2$, and an optical cladding (outside portion 212) arranged to surround the periphery of this center core and comprised of pure silica glass without being doped with $GeO_2$, and the glass pipe 22 is comprised of pure silica glass.

Each of the core rods $21_0$-$21_6$ is produced by the OVD method or the like. The holes 220 of the glass pipe 22 are formed by perforation of the glass body 10 of the nearly circular cylinder shape by means of a drill.

At position A in FIG. 6, the glass pipe 22 has not passed the heat source 300 yet, and thus the core rods $21_0$-$21_6$ and the glass pipe 22 still remain non-integrated (FIG. 7A). At position B in FIG. 6, integration by the heat source 300 is in progress, so that the six core rods $21_1$-$21_6$ and the glass pipe 22 are already integrated while the core rod $21_0$ at the center and the glass pipe 22 still remain non-integrated (FIG. 7B). At position C in FIG. 6, the integration by the heat source 300 is finished, so that all the core rods $21_0$-$21_6$ and the glass pipe 22 are already integrated, thereby achieving the sectional structure of the multicore optical fiber preform 3 (FIG. 7C).

In the preform manufacturing method of the present embodiment belonging to the rod-in-collapse method, as described above, the heating integration step ST20 is carried out to implement the integration with the glass pipe in order from the core rods located outside out of the plurality of core rods. This is considered because the glass pipe 22 is more likely to be heated to deform faster in the outside region closer to the heat source 300.

In this situation, at the position A in FIG. 6, the six core rods $21_1$-$21_6$ (peripheral core rods) arranged so as to surround the pipe central axis AX move closer to the pipe central axis AX in the holes 220 of the glass pipe 22 (FIG. 7A). A conceivable reason for it is as follows: the outside portion of the glass pipe 22 is likely to deform inward in consideration of axially symmetric deformation, while the inside portion is less likely to deform because of nowhere to go toward the pipe central axis AX; in addition, the glass pipe 22 is relatively less likely to be heated with increasing distance toward inside.

For this reason, in the multicore optical fiber preform 3 manufactured by the rod-in-collapse method, the peripheral core portions $31_1$-$31_6$ arranged outside, except for the core portion $31_0$ located on the preform central axis AX, deviate toward the pipe central axis AX of the glass pipe 22 from the center positions of the holes 220 of the glass pipe 22.

The larger a clearance between the inner wall surfaces of the holes 220 of the glass pipe 22 and the outer peripheral surfaces of the core rods $21_1$-$21_6$ including the peripheral core portions, the larger a deviation amount of the core portions $31_1$-$31_6$ in the multicore optical fiber preform 3. Since it can be considered that these core rods $21_1$-$21_6$ are not in contact with the inside of the holes 220 of the glass pipe 22, it is difficult to highly accurately control the positions dependent on the deviation of the peripheral core portions $31_1$-$31_6$.

When, as shown in FIGS. 6 and 7A-7C, there is a clearance due to another hole (the hole at the center) between the outside holes and the pipe central axis AX of the glass pipe 22, there is also motion toward the pipe central axis AX of the outside core rods $21_1$-$21_6$ due to influence of the clearance.

Figure 8:
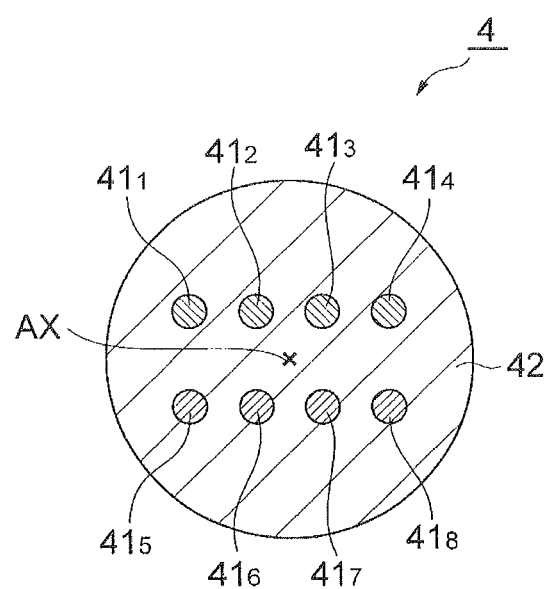
FIG. 8 is a drawing showing a structure in a transverse section of another example of multicore optical fiber which can be manufactured by the preform manufacturing method according to the embodiment of the present invention.

FIG. 8 is a drawing showing a structure in a transverse section of another example of multicore optical fiber which can be manufactured by the preform manufacturing method according to the embodiment of the present invention. This multicore optical fiber 4 has eight cores $41_1$ to $41_8$ each extending in a predetermined axial direction, and a common cladding 42 covering each of the cores $41_1$-$41_8$. The eight cores $41_1$-$41_8$ are arranged in two rows and four columns on the transverse section perpendicular to the preform central axis AX. Four cores $41_1$-$41_4$ are arranged at a constant pitch on a certain straight line and four cores $41_5$-$41_8$ are arranged at a constant pitch on another straight line. Each of the cores $41_1$-$41_8$ includes a region having the refractive index higher than that of the common cladding 42 and allows light to propagate therein.

Figure 9A:
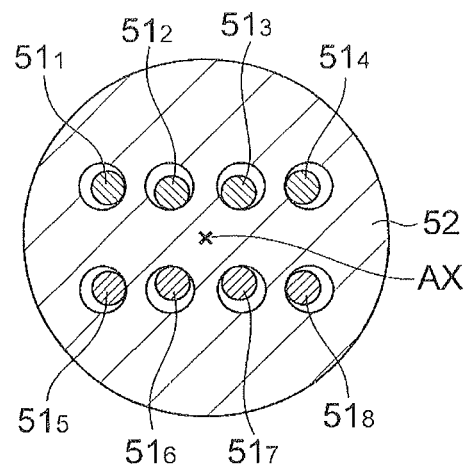
FIGS. 9A and 9B are drawings showing structures in transverse sections of respective portions of a preform (corresponding to cross sections along the line A-A' and the line C-C', respectively, in FIG. 6) in the preform manufacturing step of the multicore optical fiber shown in FIG. 8.
Figure 9B:
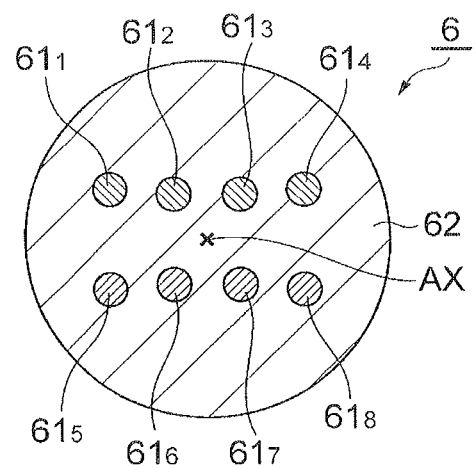

FIGS. 9A and 9B are drawings showing structures in transverse sections of portions of the preform, in the preform manufacturing step of the multicore optical fiber 4 shown in FIG. 8 (which correspond to cross sections taken along the line A-A' and the line C-C', respectively, in FIG. 6). These FIGS. 9A and 9B are drawings for schematically explaining the preform manufacturing method for manufacturing a multicore optical fiber preform 6 for obtaining the multicore optical fiber 4 (the preform manufacturing method according to the embodiment of the present invention). The multicore optical fiber preform 6 has eight core portions $61_1$ to $61_8$ each extending in the predetermined axial direction, and a common cladding portion 62 covering each of the core portions $61_1$-$61_8$ (FIG. 9B). The multicore optical fiber 4 having the transverse sectional structure in FIG. 8 is obtained by drawing this multicore optical fiber preform 6 along the preform central axis AX thereof.

In this case, the preform manufacturing method according to the present embodiment also has the hole forming step ST10 and the heating integration step ST20 as shown in FIG. 2. The hole forming step ST10 is to perforate a glass body of a nearly circular cylinder shape to form eight holes extending along the central axis thereof, thereby producing a glass pipe 52. In the heating integration step ST20, first, core rods $51_1$ to $51_8$ are inserted into the respective holes of the glass pipe 52. Then, as shown in FIG. 5, the core rods $51_1$-$51_8$ and the glass pipe 52 are integrated with the heated part being moved, thereby to manufacture the multicore optical fiber preform 6.

In the manufacture of the multicore optical fiber preform 6 as described above, the glass pipe 52 also deforms in the heating integration step ST20 so that the core rods $51_1$-$51_8$ move toward the pipe central axis AX as shown in FIG. 9A. For this reason, unless the deformation of the glass pipe 52 is taken into consideration, each of the core portions $61_1$-$61_8$ in FIG. 9B will deviate from the designed position.

For solving this problem, the preform manufacturing method according to the embodiment of the present invention is arranged as follows: concerning each core portion (peripheral core portion) located off the central axis AX out of the plurality of core portions of the multicore optical fiber preform to be manufactured, the position of the hole to be formed in the hole forming step ST10 is determined in consideration of positional change in the heating integration step ST20. Specifically, it is as described below.

FIGS. 10A and 10B are drawings for quantitatively explaining the preform manufacturing method according to the embodiment of the present invention. FIG. 10A shows a transverse section of the multicore optical fiber preform 3 to be manufactured. FIG. 10B shows a transverse section of the glass pipe 22.

As a structure parameter after the integration, d is defined as a distance between the center position of each of the peripheral core portions $31_1$-$31_6$ and the central axis AX of the multicore optical fiber preform 3. As structure parameters before the integration, r is defined as the radius of the core rods (peripheral core rods) $21_1$-$21_6$ corresponding to the peripheral core portions $31_1$-$31_6$, R as the radius of the holes (peripheral holes) into which the peripheral core rods $21_1$-$21_6$ are to be inserted, out of the plurality of holes to be formed in the glass body, and D as a distance between the center position of each peripheral hole and the central axis AX of the glass body.

Under this definition, the hole forming step ST10 is configured to perforate the glass body 10 to form each peripheral hole at a position satisfying the relation of formula (1) below on a straight line connecting the center position of the peripheral core portion and the central axis AX of the glass body 10. This formula indicates that each hole is made with an outward shift not more than a one-side clearance (R−r) between the core rod and the hole.

$$d < D \leq d + R - r \quad (1)$$

Furthermore, when, as shown in FIGS. 6 and 7A-7C, there is a clearance 23 due to another hole (the hole on the pipe central axis AX) between the peripheral hole and the central axis AX of the glass pipe 22, a sectional area of the clearance 23 is defined as S. In this case, the hole forming step ST10 is configured to perforate the glass body 10 to form each peripheral hole at a position satisfying the relation of formula (2) below on a straight line connecting the center position of each peripheral core portion and the central axis AX of the glass body 10. When the glass body 10 is perforated to form the holes at such positions, influence of this clearance 23 is mitigated. When $R_0$ is defined as the radius of the other hole existing between each peripheral hole and the pipe central axis AX of the glass pipe 22 and $r_0$ as the radius of the core rod to be inserted into the hole, the sectional area S of the clearance 23 is represented by formula (3) below.

$$d < D \leq d + 2R - r - \sqrt{R^2 - S/\pi} \quad (2)$$

$$S = \pi(R_0^2 - r_0^2) \quad (3)$$

In view of position accuracy of the peripheral core portions, the clearance is preferably as small as possible. Namely, decrease in the value of R−r can lead to decrease in position change amount of each peripheral core portion before and after the heating integration step ST20. For example, when the value of R−r is 1 mm, the center of each peripheral hole is preliminarily arranged 0 to 1 mm outside according to formula (1). When the value of R−r is 0.5 mm, the center of each peripheral hole is preliminarily arranged 0 to 0.5 mm outside. When the value of R−r is 0.1 mm, the center of each peripheral hole is preliminarily arranged 0 to 0.1 mm outside. As the clearance is decreased, motion of the peripheral core portions before and after the heating integration step ST20 becomes smaller, so as to improve the position accuracy of the peripheral core portions in the multicore optical fiber preform after the heating integration step ST20.

On the other hand, when the clearance is too small, there will arise problems such as (1) the inner wall surfaces of the holes of the glass pipe 22 or the outer peripheral surfaces of the core rods 21 become more likely to be scratched during insertion of the core rods 21 into the holes of the glass pipe 22, (2) it becomes difficult to clean the inner wall surfaces of the holes of the glass pipe 22 and the outer peripheral surfaces of the core rods 21 by a chlorine treatment before the heating in the heating integration step ST20, and (3) the required accuracy for the diameters of the holes of the glass pipe 22 and the core rods 21 becomes higher, so as to raise manufacturing cost. Therefore, the difference between the radius R of the peripheral holes and the radius r of the peripheral core rods is preferably not less than 0.15 mm (formula (4) below) and more preferably not less than 0.5 mm.

$$R-r \geq 0.15 \text{ mm} \quad (4)$$

In the multicore optical fiber manufactured by drawing the multicore optical fiber preform, the position accuracy of the cores is also dependent on a diameter reduction ratio in the drawing step. As the diameter reduction ratio $\phi$ becomes larger, the influence of the position accuracy of the core portions in the multicore optical fiber preform is more mitigated. When the diameter of the multicore optical fiber is fixed, the influence of the position accuracy of the core portions in the multicore optical fiber preform is more mitigated as the diameter of the multicore optical fiber preform becomes larger.

The diameter reduction ratio $\phi$ is defined by a ratio of the diameter of the multicore optical fiber to the diameter of the multicore optical fiber preform immediately after the heating integration step ST20. When consideration is given to cases where the diameter of the multicore optical fiber preform is changed after the heating integration step ST20 and before the drawing step, the diameter reduction ratio $\phi$ is defined by a ratio of the inter-core pitch in the multicore optical fiber to the inter-core-portion pitch in the multicore optical fiber preform immediately after the heating integration step ST20.

When the position accuracy of the core portions in the multicore optical fiber preform is 0.5 mm and the diameter reduction ratio $\phi$ is 0.004, the position accuracy of the cores in the multicore optical fiber is calculated as 0.5 mm×0.004=2.0 µm. When the position accuracy of the core portions in the multicore optical fiber preform is 0.5 mm and the diameter reduction ratio $\phi$ is 0.002, the position accuracy of the cores in the multicore optical fiber is calculated as 1.0 µm.

The position accuracy of the cores required of the multicore optical fiber is, for example, not more than 1 m and, preferably, not more than 0.5 µm. Since the position accuracy of the cores in the multicore optical fiber is not attributed only to the clearance, the position accuracy of the cores due to the clearance between the holes of the glass pipe 22 and the core rods 21 is preferably not more than 0.5 µm (formula (5) below) and more preferably not more than 0.2 µm.

$$(R-r)\phi \leq 0.5 \text{ µm} \quad (5)$$

Formula (6) below is derived from the foregoing formulas (4) and (5). Since in this formula (6) the value of the right-hand side has to be not less than the value of the left-hand side, the diameter reduction ratio $\phi$ needs to be smaller than 0.0033. For example, when the outer diameter of the multicore optical fiber is 125 µm, the outer diameter of the multicore optical fiber preform is not less than 37.5 mm. When the outer diameter of the multicore optical fiber is 150 µm, the outer diameter of the multicore optical fiber preform is not less than 45 mm.

$$0.15 \text{ mm} \leq R-r \leq 0.5 \text{ µm}/\phi \quad (6)$$

REFERENCE SIGNS LIST 1, 4 multicore optical fiber; 3, 6 multicore optical fiber preform; 10 glass body (before formation of holes); $11_0$-$11_6$, $41_1$-$41_8$ cores; 12, 42 cladding; $21_0$-$21_6$, $51_1$-$51_8$ core rods; 22, 52 glass pipe; 23 clearance; $31_0$-$31_6$, $61_1$-$61_8$ core portions; 32, 62 cladding portion.

The invention claimed is:

1. A preform manufacturing method for manufacturing a multicore optical fiber preform comprising a plurality of core portions each extending in a predetermined axial direction, and a common cladding portion covering each of the plurality of core portions, the preform manufacturing method comprising:
   a hole forming step of preparing a glass body to constitute a part of the common cladding portion, and perforating the glass body to form a plurality of holes each extending in the axial direction of the glass body, thereby producing a glass pipe; and
   a heating integration step of preparing a plurality of core rods each including a respective core portion of the plurality of core portions, inserting each of the plurality of core rods into a respective hole of the plurality of holes of the glass pipe, and heating the glass pipe with the plurality of core rods being inserted in the respective holes, thereby to implement integration of the plurality of core rods and the glass pipe,
   wherein, when as a structure parameter after the integration, d is defined as a distance between a center position of a peripheral core portion located off a central axis of the multicore optical fiber preform and the central axis of the multicore optical fiber preform, and
   as structure parameters before the integration, r is defined as a radius of a peripheral core rod corresponding to the peripheral core portion, R as a radius of a peripheral hole into which the peripheral core rod is to be inserted, out of the plurality of holes to be formed in the glass body, and D as a distance between a center position of the peripheral hole and the central axis of the glass body,
   the hole forming step is configured to perforate the glass body to form a peripheral hole at a position satisfying the following relation on a straight line connecting the center position of the peripheral core portion and the central axis of the glass body:

$d < D \leq d + R - r$.

2. The preform manufacturing method according to claim 1, wherein, when $\phi$ is defined as a diameter reduction ratio of an outer diameter of a multicore optical fiber to be manufactured by drawing the multicore optical fiber preform, with respect to an outer diameter of the multicore optical fiber preform,
   the hole forming step is configured to set the radius R of the peripheral hole so as to satisfy the following condition:

$R - r \leq 0.5 \text{ um}/\phi$.

3. The preform manufacturing method according to claim 1, wherein the hole forming step is configured to make a difference between the radius R of the peripheral hole and the radius r of the peripheral core rod not less than 0.15 mm.

4. A preform manufacturing method for manufacturing a multicore optical fiber preform comprising a plurality of core portions each extending in a predetermined axial direction, and a common cladding portion covering each of the plurality of core portions, the preform manufacturing method comprising:
   a hole forming step of perforating a glass body constituting a part of the common cladding portion to form a plurality of holes each extending in the axial direction of the glass body, thereby producing a glass pipe; and a heating integration step of preparing a plurality of core rods each including a respective core portion of the plurality of core portions, inserting each of the plurality of core rods into respective hole of the plurality of holes of the glass pipe, and heating the glass pipe with the plurality of core rods being inserted in the respective holes, thereby to implement integration of the plurality of core rods and the glass pipe, wherein, when as a structure parameter after the integration, d is defined as a distance between a center position of a peripheral core portion located off a central axis of the multicore optical fiber preform and the central axis of the multicore optical fiber preform, and as structure parameters before the integration, r is defined as a radius of a peripheral core rod corresponding to the peripheral core portion, R as a radius of a peripheral hole into which the peripheral core rod is to be inserted, out of the plurality of holes to be formed in the glass body, D as a distance between a center position of the peripheral hole and the central axis of the glass body, and S a sectional area of a clearance in another hole existing between the peripheral hole and a central axis of the glass pipe, the hole forming step is configured to perforate the glass body to form a peripheral hole at a position satisfying the following relation on a straight line connecting the center position of the peripheral core portion and the central axis of the glass body:

$$d < D \leq d + 2R - r - \sqrt{R^2 - S/\pi}.$$

5. The preform manufacturing method according to claim 4, wherein, when $\phi$ is defined as a diameter reduction ratio of an outer diameter of a multicore optical fiber to be manufactured by drawing the multicore optical fiber preform, with respect to an outer diameter of the multicore optical fiber preform, the hole forming step is configured to set the radius R of the peripheral hole and the clearance so as to satisfy the following condition:

$$R - r \leq 0.5 \ \mu m/\phi.$$

6. The preform manufacturing method according to claim 4, wherein the hole forming step is configured to make a difference between the radius R of the peripheral hole and the radius r of the peripheral core rod not less than 0.15 mm.

* * * * *